(12) United States Patent
Gaduparthi et al.

(10) Patent No.: US 11,500,368 B2
(45) Date of Patent: Nov. 15, 2022

(54) PREDICTING EARLY WARNINGS OF AN OPERATING MODE OF EQUIPMENT IN INDUSTRY PLANTS

(71) Applicant: Tata Consultancy Services Limited, Mumbai (IN)

(72) Inventors: Trinath Gaduparthi, Pune (IN); Purushottham Gautham Basavarsu, Pune (IN); Yogesh Tambe, Pune (IN); Himanshu Nirgudkar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 147 days.

(21) Appl. No.: 17/060,688

(22) Filed: Oct. 1, 2020

(65) Prior Publication Data
US 2021/0365022 A1 Nov. 25, 2021

(30) Foreign Application Priority Data
May 21, 2020 (IN) .............................. 202021021476

(51) Int. Cl.
*G05B 23/02* (2006.01)

(52) U.S. Cl.
CPC ..... *G05B 23/0278* (2013.01); *G05B 23/0235* (2013.01); *G05B 23/0205* (2013.01); *G05B 23/0221* (2013.01); *G05B 23/0254* (2013.01)

(58) Field of Classification Search
CPC ............ G05B 23/0278; G05B 23/0235; G05B 23/0254; G05B 23/0205; G05B 23/0221
See application file for complete search history.

(56) References Cited

U.S. PATENT DOCUMENTS

| 2005/0210337 A1* | 9/2005 | Chester | G05B 23/0254 |
| | | | 714/47.2 |
| 2009/0037772 A1* | 2/2009 | Wegerich | G06N 5/025 |
| | | | 714/E11.002 |

(Continued)

FOREIGN PATENT DOCUMENTS

| BR | 102016023297 A2 | 5/2018 | |
| CN | 110275814 A * | 9/2019 | .......... G06F 11/3065 |
| WO | WO-2019142331 A1 * | 7/2019 | .......... G06F 11/0706 |

OTHER PUBLICATIONS

Author: Kexing Zhao and Xianjiu Huangy Title: An extension of ELECTRE to multi-criteria decision making problems with extended hesitant fuzzy sets Title of the item: Romanian Journal of Information Science and Technology Date: 2018 vol. 21, No. 4 pp. 328-343 Publisher: Research Gates Link: https://www.romjist.ro/full-texts/paper605.pdf.

(Continued)

*Primary Examiner* — Daniel R Miller
*Assistant Examiner* — Christian T Bryant
(74) *Attorney, Agent, or Firm* — Finnegan, Henderson, Farabow, Garrett & Dunner LLP

(57) ABSTRACT

Currently solutions for early detection of failures in manufacturing utilize predefined threshold levels of the process variables associated with equipment in manufacturing unit/ industry plants. The pre-defined threshold and levels thereof are compared with the real values obtained from the manufacturing unit to check behavior of process variables (also referred as 'process parameters') and thus are prone to error. The present disclosure provides systems and method for predicting early warning of operating mode of equipment operating in industry plants which is based on transforming conditions on process parameters into conditions on corresponding fuzzy indices based on their thresholds. The fuzzy indices (concordance index, discordance index) of indi- (Continued)

vidual conditions are combined into a composite fuzzy index (composite index or degree of credibility) that describes the failure scenario in the process parameter space. A fuzzy logic-based detection is useful for detecting a failure mode early and providing alerts to operators for necessary action.

18 Claims, 13 Drawing Sheets

(56) References Cited

U.S. PATENT DOCUMENTS

| | | | | |
|---|---|---|---|---|
| 2017/0102693 | A1* | 4/2017 | Kidd | G05B 19/41875 |
| 2017/0169143 | A1* | 6/2017 | Farahat | G06Q 10/06393 |
| 2018/0307219 | A1* | 10/2018 | Horiwaki | G06N 5/022 |
| 2019/0057317 | A1* | 2/2019 | Malhotra | G01M 15/14 |
| 2020/0133257 | A1* | 4/2020 | Celia | G05B 13/028 |

OTHER PUBLICATIONS

Author: Hu-Chen Liu, Jian-Xin You, Shouming Chen, and Yi-Zeng Chen Title: An integrated failure mode and effect analysis approach for accurate risk assessment under uncertainty Title of the item: Quality & Reliability Engineering Date: 2016 vol. 48, 2016—Issue 11 pp. 1027-1042 Publisher: IIE Transactions Link: http://dx.doi.org/10.1080/0740817X.2016.1172742.

Author: Certa Antonella, Enea Mario, Galante Giacomo Maria, La Fata Concetta Manuela Title: ELECTRE TRI-based approach to the failure modes classification on the basis of risk parameters: an alternative to the Risk Priority No. Title of the item: Computers & Industrial Engineering Date: Apr. 2017 Publisher: Research Gates. Link: https://www.researchgate.net/publication/316079957_ELECTRE_TRI-based_approach_to_the_failure_modes_classification_on_the_basis_of_risk_parameters_an_alternative_to_the_Risk_Priority_Number/link/59db28e0458515a5bc2d6f89/download?_cf_chl_captcha_tk_=29d0b1fc05d1ef99545408f292c09ccada8489b9-1601007286-0-AQzQFMQA8onnklhtRWoEUfRpqLBjfdqQDVM2J_f4WRa7VmM1m26QCn5-kV0D0wLsLidzt48xO1LJIPc6IMEgJUz iRnqVpNCiycxfJJuD3okypTU-8_omvKYVB_ycg4qgcD0abl2x869 rwyth9S5NIIUpjGxnohJSuDSKyF9Gzn4Xhpse8zzDzU8fGFhBGC cdGMU_EMG8KRF6M54-l6TlsVPuSUi8KgSxlAAW44BgPffUia HpTrAR5APxkbWhMDP4a7wpUkvTgVdyg4f1-PvpEkFqPzuX0CTexbDbE5bbUGH8NlwlzttoO8ZVGiAKw-x4WTG nHgHH03GdhUwpthU4wChsl6HkPVtRzlWsoglyHlYcKagJk4Pkz eWhpiGlpEa9Ym-xdE3jjnX-ABuwUSrup4JNmpwcPd29syxkSTqdSa2bC_btVFCx_6yTNj8cXVfHOsgg6vDwsS0zuu7NP3GzCKzKBoF5Tv8NgxCyi-SpkKveNMglox5kierB_4NUnneY0pXLgO0JkOw_hDyQOuqJyGGevhmdllv-ZjWfB5eHgra5xRBEiVptOgnzMIFJXPn7ok-4gJm9JbkYgNlmfS6yTogKiBwCerNHJvXNaOYcPlgf5_ERn_iSLOxD-BV2ruu7kSLTjHXp1eUqUbf31_dSXYUK7mFplfvbZ17d 8kwVExNlvjYinQPl0OxDRycNrTpT7VxV9G1LWv66VqDUuKt GzLN6_J86e5pqi4jWWi2ScMz0fPmziPn3sPWG5O4Ssmoje6D0G MumPz6JlcrWtDojcsVbYNowaxpGRNArBlnbg6dKeVni_iixlxuP3bsjPnwhQ.

* cited by examiner

Concordance index of DT/Dt

Concordance index of PD

Discordance index of DT/Dt

Discordance index of PD

PREDICTING EARLY WARNINGS OF AN OPERATING MODE OF EQUIPMENT IN INDUSTRY PLANTS

PRIORITY CLAIM

This U.S. patent application claims priority under 35 U.S.C. § 119 to: India Application No. 202021021476, filed on May 21, 2020. The entire contents of the aforementioned application are incorporated herein by reference.

TECHNICAL FIELD

The disclosure herein generally relates to monitoring industry plant operations, and, more particularly, to predicting early warnings of an operating mode of equipment in industry plants.

BACKGROUND

Process industries are complex systems that include process, equipment and sensor networks. Sensors measure health of a process or an equipment by measuring a direct physical quantity or an indirect parameter indicative of the health of a system under consideration. Different modes of failure associated with the equipment are detected when associated equipment health parameters cross predefined thresholds or a safe operating range. The effects of failure modes (above different modes of failure) of the equipment necessitate corrective actions from the operator. An early detection of a failure mode helps in easing load on an operator and provides valuable time to mitigate any unwarranted industrial disasters.

Conventional systems and methods have used fixed window of thresholds over process variables for detecting failures, wherein a decision on the onset of failure is made based on violation of these thresholds in a Boolean fashion or other deterministic methods. This method is followed even for a complex detection condition where the truth value of the detection condition is computed as a combination of truth values of the constituent conditions. Typically, the thresholds of process variables are set by a process engineer relying on experience with the corresponding equipment or a process. Such a binary/Boolean evaluation of the detection condition may not provide an early warning of the onset of a failure. This may lead to delay in taking corrective action(s) to control or contain a failure leading to loss in production/quality of the product.

SUMMARY

Embodiments of the present disclosure present technological improvements as solutions to one or more of the above-mentioned technical problems recognized by the inventors in conventional systems. For example, in one aspect, there is provided a processor implemented method for predicting early warnings of an operating mode of equipment in an industry plant. The method comprises obtaining time-series data from sensors associated with one or more equipment operating in the industry plant; pre-processing the obtained time-series data to obtain normalized time-series data; deriving one or more limits from at least one of the normalized time-series data and a data sheet obtained that is specific to the industry plant; computing a concordance index (CI) for one or more process parameters obtained from the sensors using a first subset of the one or more derived limits; computing a discordance index (DI) for the one or more process parameters using a second subset of the one or more derived limits; computing a degree of credibility (DOC) for the one or more process parameters based on a computed global concordance index and the discordance index; and predicting an early warning specific to at least one operating mode of the one or more equipment operating in the industry plant.

In an embodiment, the one or more derived limits comprise one or more veto limits, one or more strict limits, and one or more indifference limits.

In an embodiment, the one or more strict limits and the one or more indifference limits are derived from the one or more veto limits.

In an embodiment, the one or more derived limits are specific to the one or more process parameters of one or more processes being run in the industry plant.

In an embodiment, the first subset comprises one or more strict limits and one or more indifference limits from the one or more derived limits.

In an embodiment, the second subset comprises one or more strict limits and one or more veto limits from the one or more derived limits.

In an embodiment, the computed global concordance index is based on the concordance index (CI) and an associated weight of the one or more process parameters.

In an embodiment, the early warning is predicted based on a comparison of (i) a value of the DOC of the one or more process parameters and (ii) a pre-defined threshold.

In an embodiment, the at least one operating mode comprises a failure mode or a normal operation mode.

In another aspect, there is provided a system for predicting early warnings of an operating mode of equipment in an industry plant. The system comprises a memory storing instructions; one or more communication interfaces; and one or more hardware processors coupled to the memory via the one or more communication interfaces, wherein the one or more hardware processors are configured by the instructions to: obtain time-series data from sensors associated with one or more equipment operating in the industry plant; pre-process the obtained time-series data to obtain normalized time-series data; derive one or more limits from at least one of the normalized time-series data and a data sheet obtained that is specific to the industry plant; compute a concordance index (CI) for one or more process parameters obtained from the sensors using a first subset of the one or more derived limits; compute a discordance index (DI) for the one or more process parameters using a second subset of the one or more derived limits; compute a degree of credibility (DOC) for the one or more process parameters based on a computed global concordance index and the discordance index; and predict an early warning specific to at least one operating mode of the one or more equipment operating in the industry plant.

In an embodiment, the one or more derived limits comprise one or more veto limits, one or more strict limits, and one or more indifference limits.

In an embodiment, the one or more strict limits and the one or more indifference limits are derived from the one or more veto limits.

In an embodiment, the one or more derived limits are specific to the one or more process parameters of one or more processes being run in the industry plant.

In an embodiment, the first subset comprises one or more strict limits and one or more indifference limits from the one or more derived limits.

In an embodiment, the second subset comprises one or more strict limits and one or more veto limits from the one or more derived limits.

In an embodiment, the computed global concordance index is based on the concordance index (CI) and an associated weight of the one or more process parameters.

In an embodiment, the early warning is predicted based on a comparison of (i) a value of the DOC of the one or more process parameters and (ii) a pre-defined threshold.

In an embodiment, the at least one operating mode comprises a failure mode or a normal operation mode.

In yet another embodiment, there is provided a computer program product comprising a non-transitory computer readable medium having a computer readable program embodied therein, wherein the computer readable program, when executed on a computing device, causes the computing device to predict early warnings of an operating mode of equipment in an industry plant by: obtaining, via one or more hardware processors, time-series data from sensors associated with one or more equipment operating in the industry plant; pre-processing, via the one or more hardware processors, the obtained time-series data to obtain normalized time-series data; deriving, via the one or more hardware processors, one or more limits from at least one of the normalized time-series data and a data sheet obtained that is specific to the industry plant; computing, via the one or more hardware processors, via the one or more hardware processors, a concordance index (CI) for one or more process parameters obtained from the sensors using a first subset of the one or more derived limits; computing, via the one or more hardware processors, a discordance index (DI) for the one or more process parameters using a second subset of the one or more derived limits; computing, via the one or more hardware processors, a degree of credibility (DOC) for the one or more process parameters based on a computed global concordance index and the discordance index; and predicting, via the one or more hardware processors, an early warning specific to at least one operating mode of the one or more equipment operating in the industry plant.

In an embodiment, the one or more derived limits comprise one or more veto limits, one or more strict limits, and one or more indifference limits.

In an embodiment, the one or more strict limits and the one or more indifference limits are derived from the one or more veto limits.

In an embodiment, the one or more derived limits are specific to the one or more process parameters of one or more processes being run in the industry plant.

In an embodiment, the first subset comprises one or more strict limits and one or more indifference limits from the one or more derived limits.

In an embodiment, the second subset comprises one or more strict limits and one or more veto limits from the one or more derived limits.

In an embodiment, the computed global concordance index is based on the concordance index (CI) and an associated weight of the one or more process parameters.

In an embodiment, the early warning is predicted based on a comparison of (i) a value of the DOC of the one or more process parameters and (ii) a pre-defined threshold.

In an embodiment, the at least one operating mode comprises a failure mode or a normal operation mode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
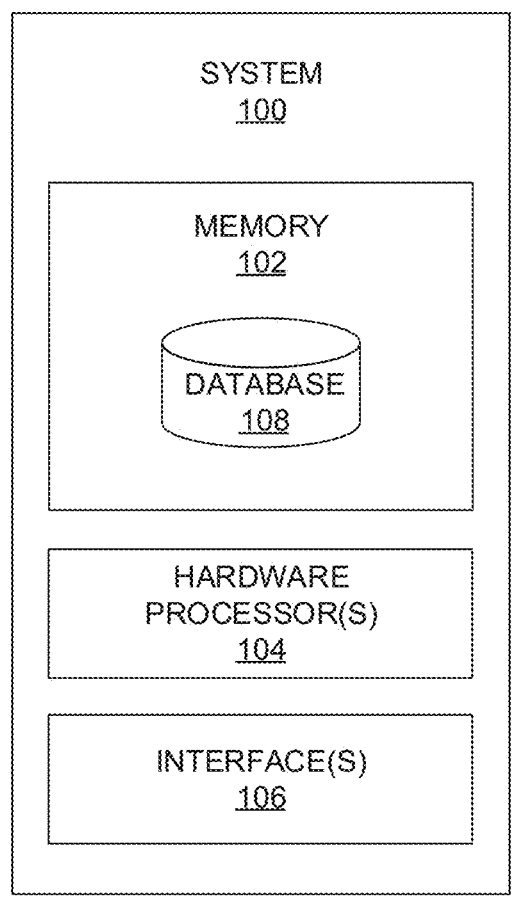
FIG. 1 depicts a system for predicting early warnings of an operating mode of equipment in an industry plant, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Currently solutions for early detection of failures in manufacturing utilize predefined threshold levels of the process variables associated equipment with the manufacturing unit/industry plants. The pre-defined threshold levels thereof are compared with the real values obtained from the manufacturing unit to check behavior of process variables (also referred as 'process parameters'). These techniques mainly utilize binary values for indicating status condition of the process variables. Generally, a failure of a process or an equipment is characterized by violation of thresholds of one or more process/equipment parameters. Hence, a detection condition for a specific failure mode consists of conditions on individual process parameters. The present disclosure provides systems and method for predicting early warning of failure mode of equipment operating in industry plants. This is based on transforming conditions on process parameters into conditions on corresponding fuzzy indices based on their thresholds. The fuzzy indices (concordance index, discordance index) of individual conditions are combined into a composite fuzzy index (composite index or degree of credibility) that describes the failure scenario in the process parameter space. A fuzzy logic-based detection is useful for detecting a failure mode early and providing alerts to operators for necessary action.

Fuzzy logic is called as many-valued logic as it may take any real value between 0 and 1 both inclusive for variables as truth values, whereas in Boolean logic the truth values of variables are integer values 0 or 1. The present disclosure and its systems and methods have adapted the ranking algorithms based on fuzzy indices for early detection of failures. Fuzzy index is used to identify how far or near to the threshold value a process parameter is. For every parameter in the detection condition, concordance and discordance indices are computed using the corresponding threshold (or computed limits) of each process parameter. The concordance and discordance indices are further used to compute Degree of Credibility, which is a combined fuzzy index for the entire detection condition.

Each process variable/process parameter has three kinds of limits: indifferent limits, strict limits and veto limits. Concordance index, and discordance index are calculated using the present value of the process variable and the three limits associated with the process variable. The concepts of Concordance index and discordance index in the present disclosure are adapted from ELECTRE-III method. ELECTRE-III is a multi-criteria decision-making method for dealing with complex ranking problems. In the present disclosure, ELECTRE III method is not used as is but concepts such as Concordance index, and discordance index and degree of credibility are adapted in an entirely different scenario.

As discussed earlier, a failure detection condition consists of multiple conditions on various process parameters. Concordance index is computed for every process parameter using the corresponding threshold. The weighted sum of all concordance indices constitutes the global concordance index (GC). Along with concordance index, every process parameter value is used to compute a discordance index which measures how close a system/equipment is to failure. The global concordance index and discordance indices of process parameters are combined to form a composite index called degree of credibility. It can be observed that a detection condition with multiple process parameters is transformed and represented in terms of a condition on a single composite index. If the value of degree of credibility is one or nearer to one, it indicates that the operational variables are in an acceptable range. If the value of degree of credibility falls below a pre-defined threshold, it indicates impending failure of the system. This early warning alerts the operator to take corrective actions to prevent system failure.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 depicts a system 100 for predicting early warnings of an operating mode of equipment in an industry plant, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on various equipment that are in an industry plant, operating status of each equipment, processes being executed on each equipment, sensory information (process parameters) capturing during operational of the equipment, wherein the sensory information may include, for example, but not limited to, pressure, temperature, and the like.

The information stored in the database 108 may further comprise information on time-series data obtained from each equipment, normalized form of the time-series data, and various limits associated with process/equipment, wherein the limits comprise for example, veto limit(s), strict limit(s), indifference limit(s), and the like. The database 108 may further comprise (i) concordance index computed for each of process parameter associated with corresponding equipment, (ii) discordance index computed for each of process parameter associated with corresponding equipment, (iii) a global concordance index computed based on the concordance index (CI) and an associated weight of each process parameter, (iv) a degree of credibility (also referred as composite index/credibility index and may be interchangeably used hereinafter) for predicting early warning specific to at least one operating mode of the one or more equipment operating in the industry plant. The memory 102 further stores a pre-defined threshold for each process being run on various equipment. The pre-defined threshold may be set based on implementation of artificial intelligence and/or machine learning models that are utilized by the present disclosure for learning historical pattern and for making intelligent decisions (e.g., dynamic configuration of threshold, and the like) and for predicting early warnings specific to operating mode of various equipment in the industry plant.

In an embodiment, the artificial intelligence techniques and/or machine learning models as known in the art are comprised in the memory 102 and invoked as per the requirement to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
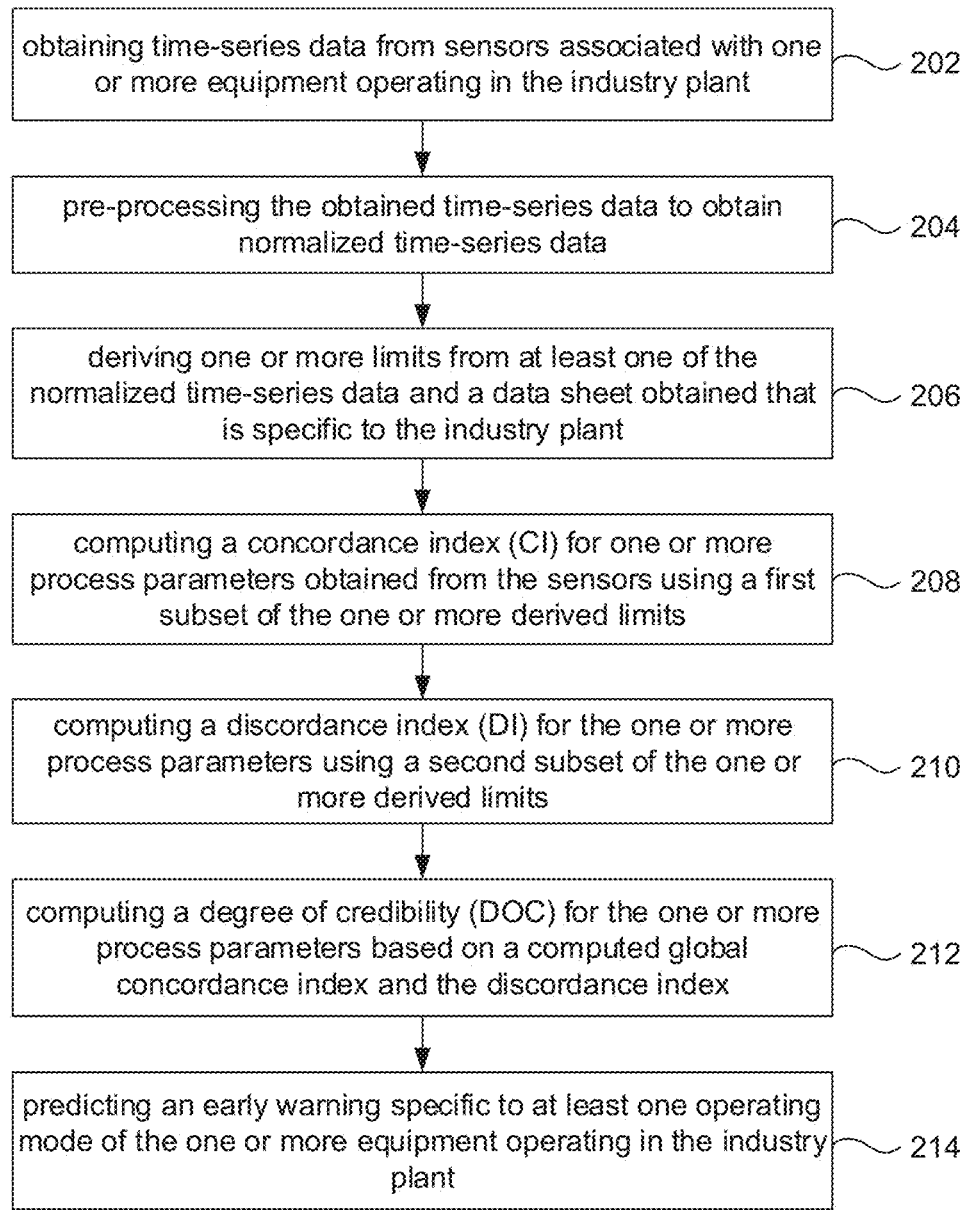
FIG. 2 depicts an exemplary flow chart illustrating a method for predicting early warnings of an operating mode of an equipment in the industry plant using the system of FIG. 1, in accordance with an embodiment of the present disclosure.
Figure 3A:
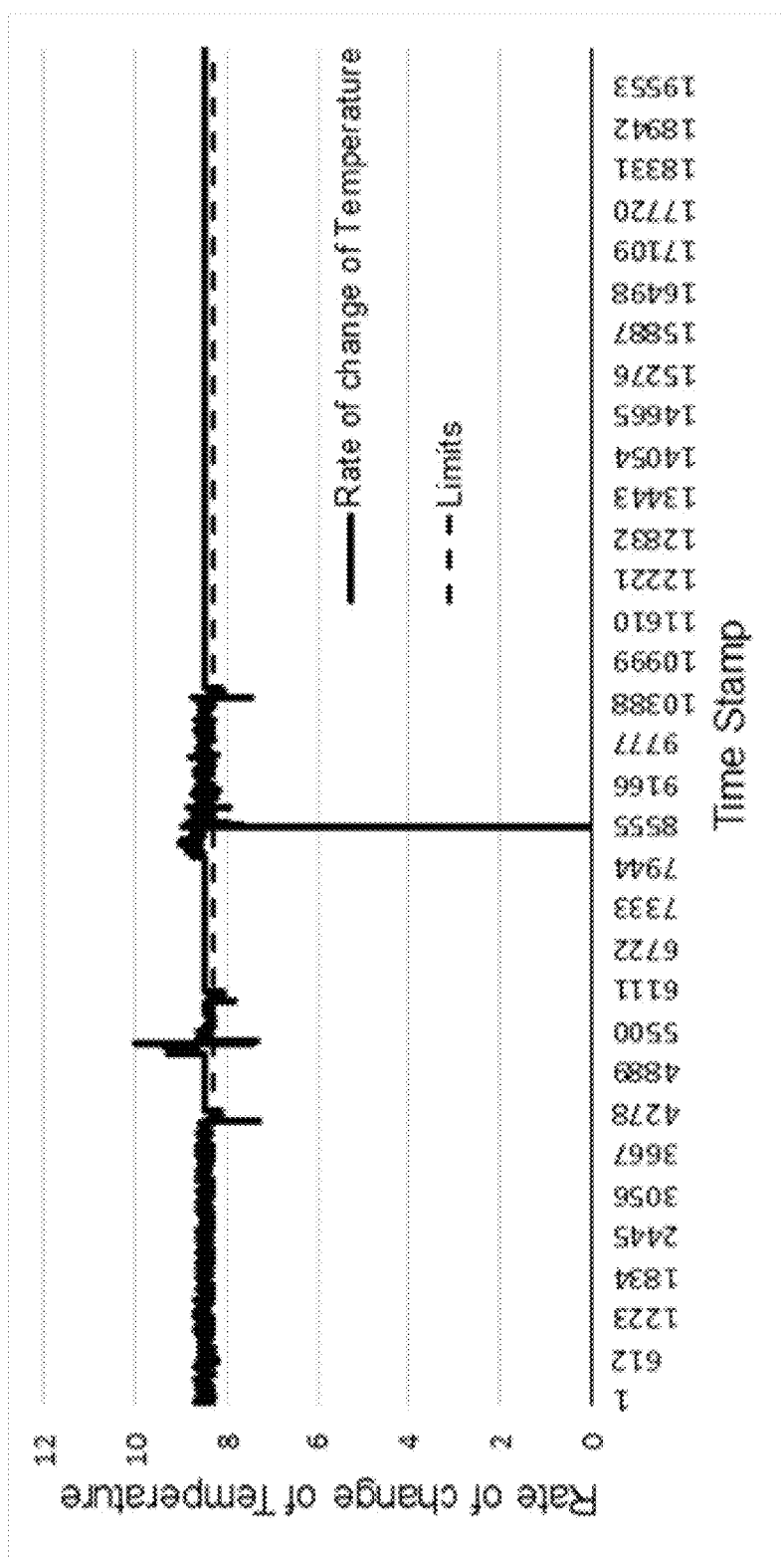
FIG. 3A depicts temperature readings obtained at various timestamps from one or more temperature sensors associated with the equipment operating in the industry plant, in accordance with an embodiment of the present disclosure.
Figure 3B:
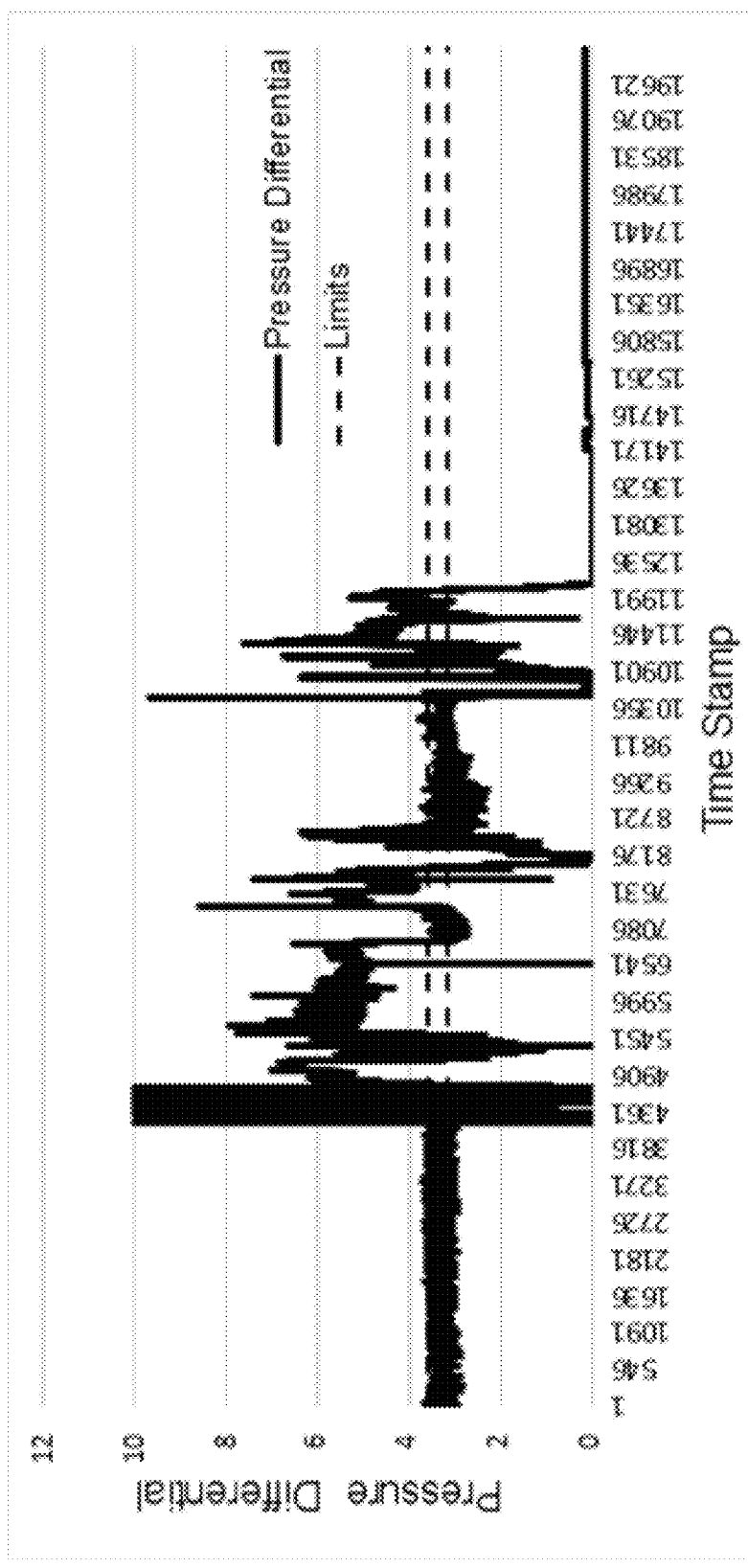
FIG. 3B depicts pressure readings obtained at various timestamps from one or more pressure sensors associated with the equipment operating in the industry plant, in accordance with an embodiment of the present disclosure.

FIG. 2, with reference to FIG. 1, depicts an exemplary flow chart illustrating a method for predicting early warnings of an operating mode of equipment in an industry plants using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2 and block diagrams of FIGS. 3-6. In an embodiment, at step 202 of the present disclosure, the one or more hardware processors 104 obtain time-series data from sensors associated with one or more equipment operating in the industry plant. For instance, FIGS. 3A and 3B, with reference to FIGS. 1-2, depict time-series data obtained from one or more sensors associated with an equipment operating in the industry plant, in accordance with an embodiment of the present disclosure. Example of industry plant may include but are not limited to oil refinery plant, steel manufacturing plant, food processing plants, dairy processing plants, and the like. Equipment operating in industry plant such as oil refinery plant may include, but are not limited to, crude oil distillation unit, vacuum distillation unit, oil hydrotreating unit, semi-regenerative reforming unit, fluid catalytic cracking unit, sulfur recovery unit, isomerization unit, and the like. It is to be understood by a person having ordinary skill in the art or person skilled in the art that the above examples of industry plants and equipment operating in such plants are illustrative examples and shall not be construed as limiting the scope of the present disclosure. Referring to step 202, in the present disclosure, the time-series data that pertains to one or more process parameters (also referred as 'detection variables' and interchangeably used hereinafter) associated with one or more processes running on corresponding equipment operating in the industry plant are obtained. More specifically, FIG. 3A depicts temperature readings obtained at various timestamps from one or more temperature sensors associated with the equipment operating in the industry plant, in accordance with an embodiment of the present disclosure. FIG. 3B depicts pressure readings obtained at various timestamps from one or more pressure sensors associated with an equipment operating in the industry plant, in accordance with an embodiment of the present disclosure.

Referring to FIG. 2, at step 204 of the present disclosure, the one or more hardware processors 104 pre-process the obtained time-series data to obtain normalized time-series data. In the present disclosure, the system 100 applies any known in the art pre-processing techniques (e.g., normalization technique(s), standardization technique(s), and the like). More specifically, technique such as moving average was applied on the obtained time-series data to remove noise, high negative values, or any unusual readings/observation and impute missing data, by the system 100 of the present disclosure to obtain the normalized time-series data. It is to be understood by a person having ordinary skill in the art or person skilled in the art that pre-processing as known in the art is a standard technique that is realized for such input data and put to practice. Hence for the sake of brevity, examples or figures for outputting normalized time-series data is not shown.

Figure 4:
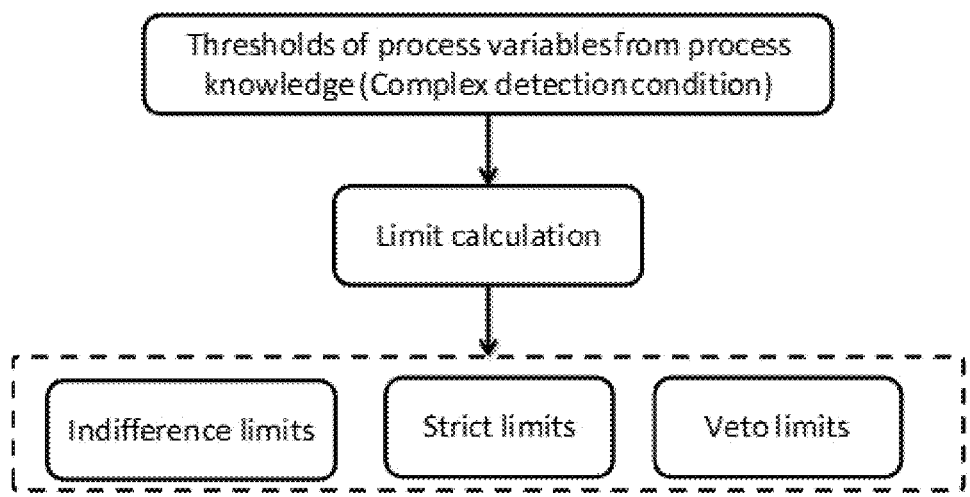
FIG. 4 depicts a flow diagram illustrating a method for deriving one or more limits from the at least one of the normalized time-series data and the data sheet obtained that are specific to the industry plant.
Figure 5:
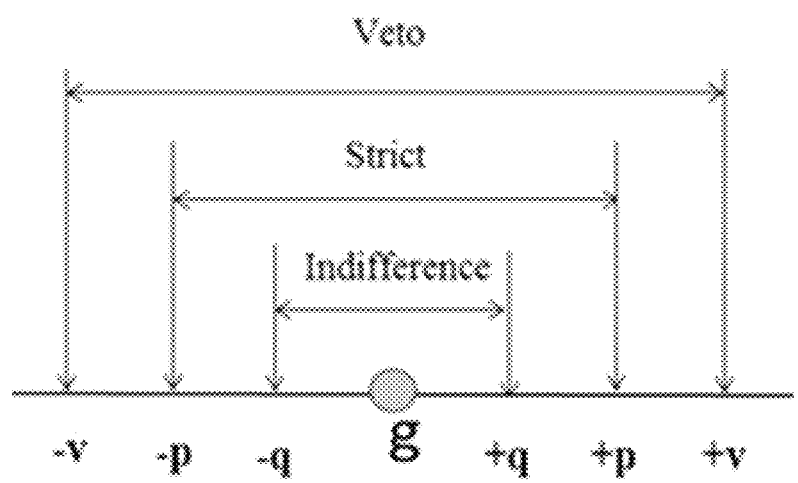
FIG. 5 depicts an exemplary diagram of one or more veto limits, one or more strict limits, and one or more indifference limits for temperature serving as a process parameter of the equipment operating in the industry plant, in accordance with an embodiment of the present disclosure.

In an embodiment of the present disclosure, at step 206, the one or more hardware processors 104 derive one or more limits from at least one of the normalized time-series data and a data sheet obtained that are specific to the industry plant. The one or more derived limits comprise one or more veto limits, one or more strict limits, and one or more indifference limits, in an embodiment of the present disclosure. In an embodiment of the present disclosure, the one or more derived limits are specific to the one or more process parameters of one or more processes being run in the industry plant. FIG. 4, with reference to FIGS. 1 through 3B, depicts a flow diagram illustrating a method for deriving one or more limits from the at least one of the normalized time-series data and the data sheet obtained that are specific to the industry plant. In the present disclosure, the one or more strict limits and the one or more indifference limits are derived from the one or more veto limits. FIG. 5, with reference to FIGS. 1 through 4, depicts an exemplary diagram of the one or more veto limits, the one or more strict limits, and the one or more indifference limits for a process parameter associated with an equipment, in accordance of an embodiment of the present disclosure.

Figure 6A:
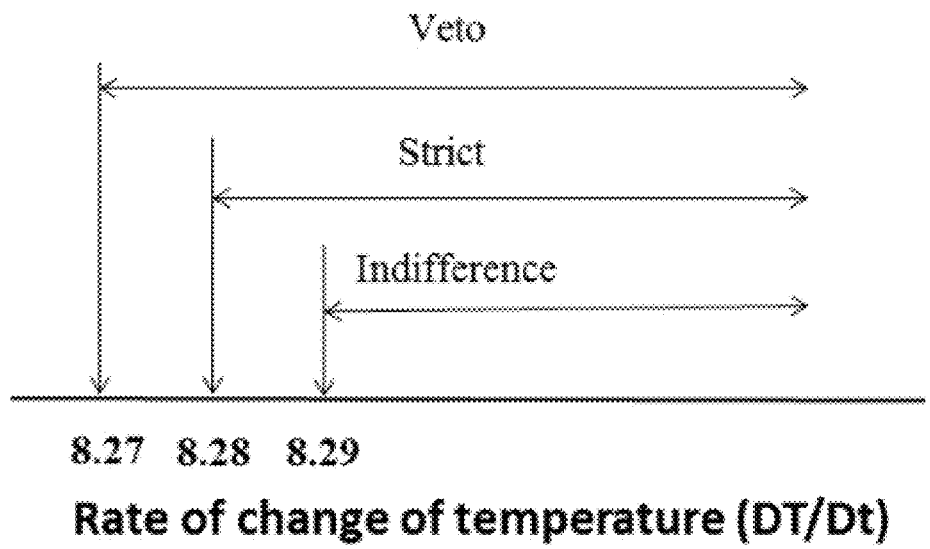
FIG. 6A depicts an exemplary diagram of the one or more veto limits, the one or more strict limits, and the one or more indifference limits for temperature serving as a process parameter of the equipment operating in the industry plant, in accordance with an embodiment of the present disclosure.
Figure 6B:
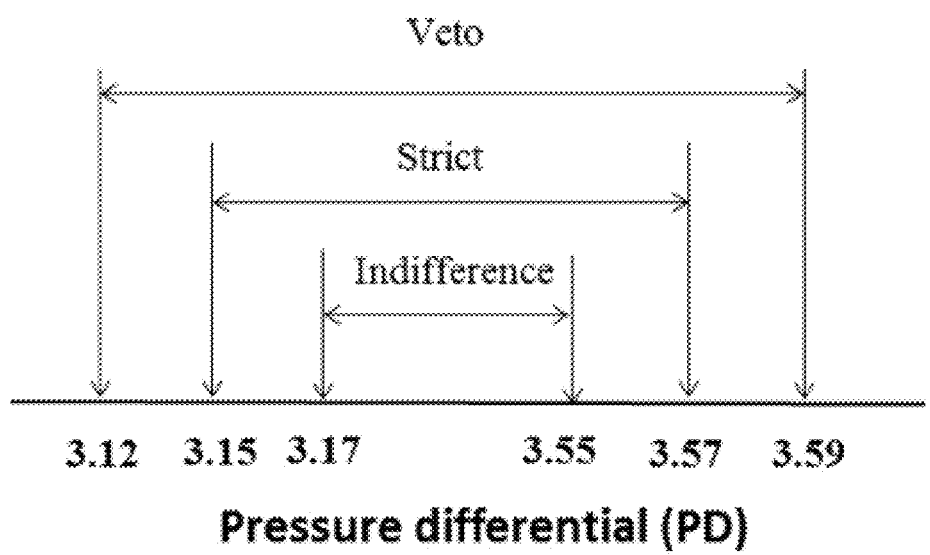
FIG. 6B depicts an exemplary diagram of the one or more veto limits, the one or more strict limits, and the one or more indifference limits for pressure serving as a process parameter of the equipment operating in the industry plant, in accordance with an embodiment of the present disclosure.

FIGS. 6A-6B, with reference to FIGS. 1 through 5, depict an exemplary diagram of the one or more veto limits, the one or more strict limits, and the one or more indifference limits for temperature and pressure serving as a process parameter in accordance with an embodiment of the present disclosure. More specifically, FIG. 6A depicts an exemplary diagram of the one or more veto limits, the one or more strict limits, and the one or more indifference limits for temperature serving as a process parameter of the equipment operating in the industry plant, in accordance with an embodiment of the present disclosure. FIG. 6B depicts an exemplary diagram of the one or more veto limits, the one or more strict limits, and the one or more indifference limits for pressure serving as a process parameter of the equipment operating in the industry plant, in accordance with an embodiment of the present disclosure.

Referring to FIG. 2, at step 208 of the present disclosure, the one or more hardware processors 104 compute a concordance index (CI) for one or more process parameters obtained from the sensors using a first subset of the one or more derived limits. Concordance index "C" is a fuzzy index defined such that it is "0" beyond the strict limits and "1" within the indifferent limits. In the region between indifferent and strict limits, it takes a linear functional form. The concordance index is computed by way of following non-construing expression:

$$C(g_i) = \begin{cases} 1 & ; g_i \leq q \\ \dfrac{p - g_i}{p - q} & ; q < g_i \leq p \\ 0 & ; g_i > p \end{cases} \quad (1)$$

where, $g_i$—value of process variable, and p, q are strict and indifferent limits of the process parameter "g".

Figure 7A:
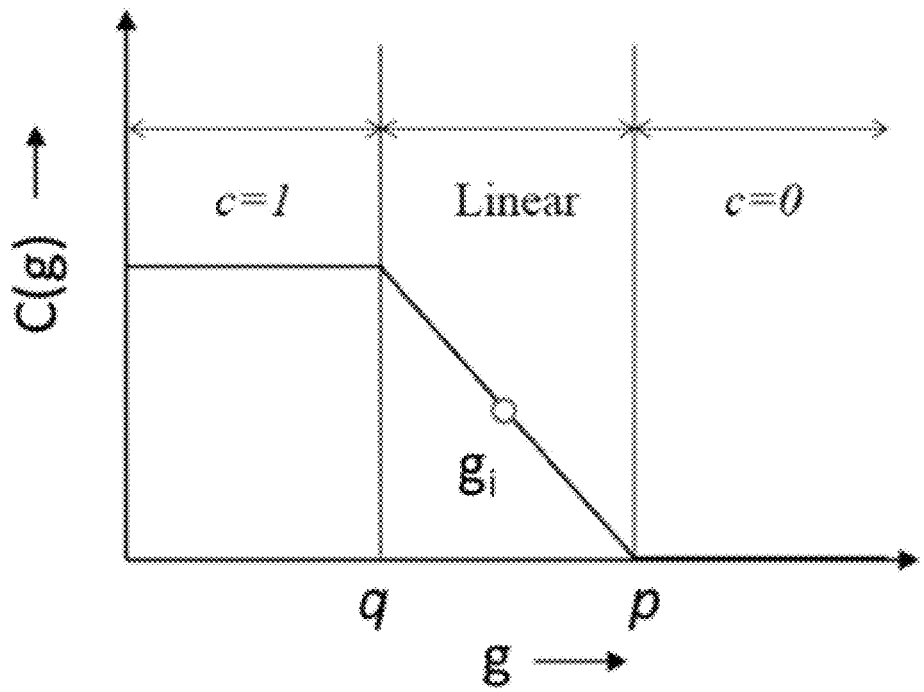
FIG. 7A depicts an exemplary diagram of a concordance index being computed for each of the one or more process parameters of the equipment operating in the industry plant, in accordance with an embodiment of the present disclosure.
Figure 7B:
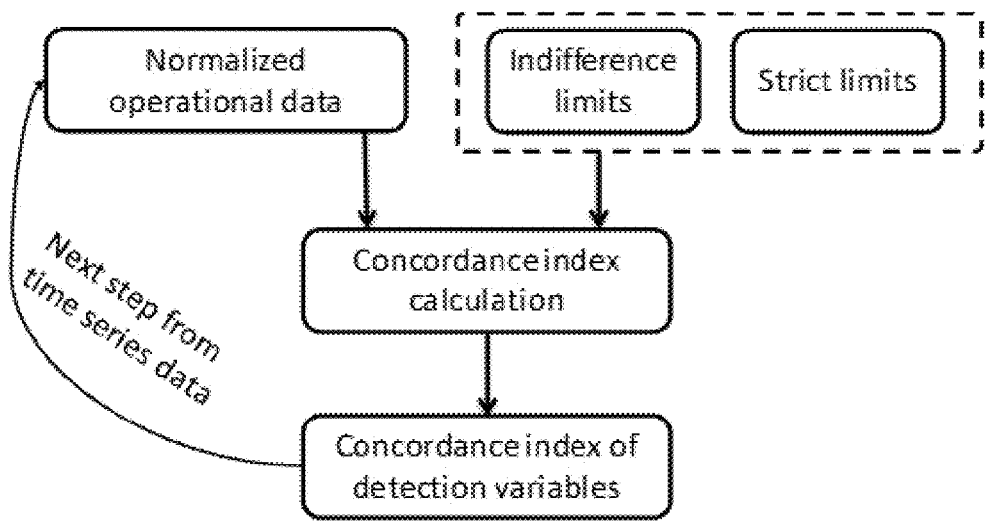
FIG. 7B depicts a flow chart illustrating a method for computing the concordance index for each of the one or more process parameters of the equipment operating in the industry plant, in accordance with an embodiment of the present disclosure.
Figure 7C:
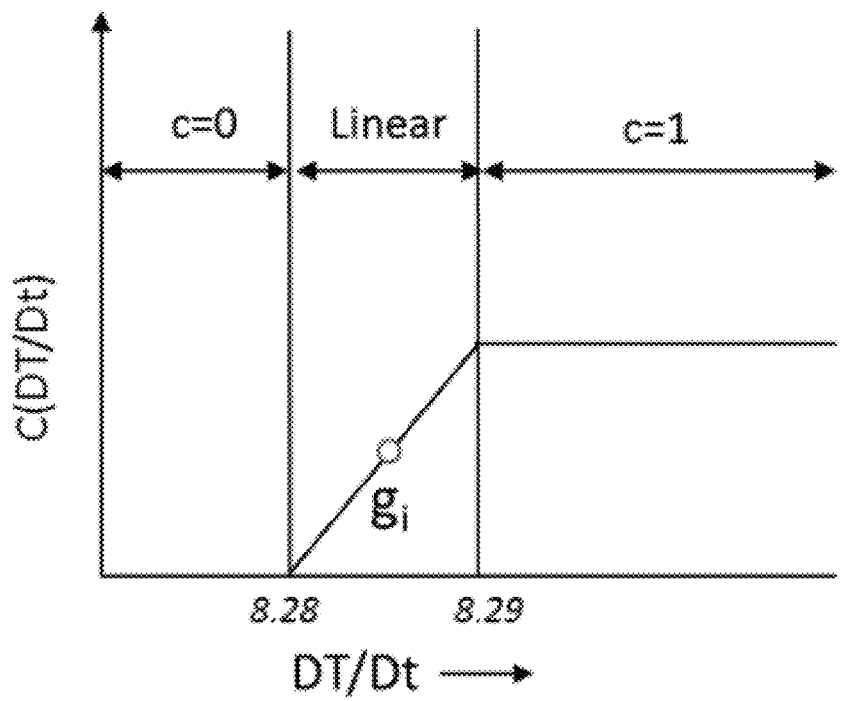
FIG. 7C depicts an exemplary diagram illustrating computation of the concordance index for temperature serving as a process parameter of the equipment operating in the industry plant, in accordance with an embodiment of the present disclosure.
Figure 7D:
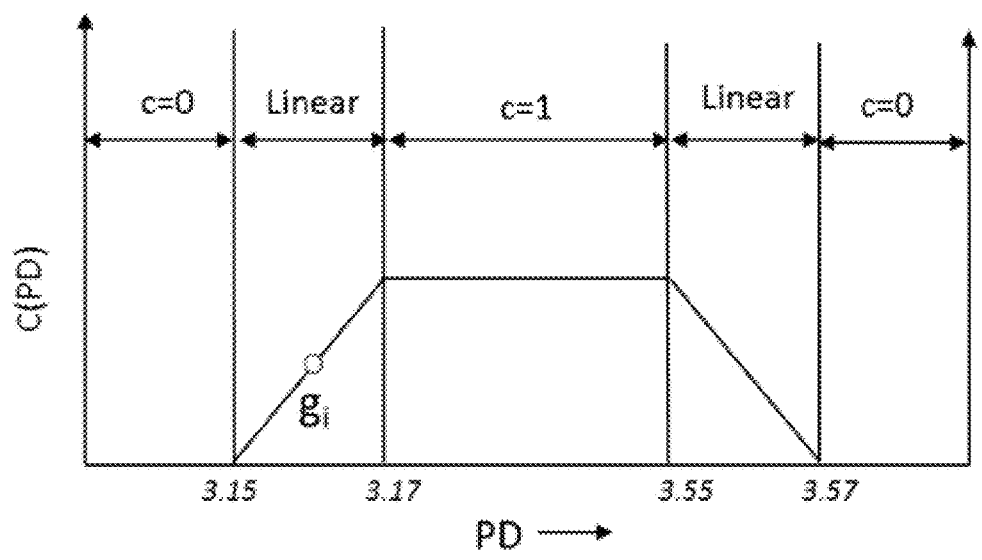
FIG. 7D depicts an exemplary diagram illustrating computation of the concordance index for pressure serving as a process parameter of the equipment operating in the industry plant, in accordance with an embodiment of the present disclosure.

More specifically, the concordance index (CI) for one or more process parameters obtained from the sensors is computed using a first subset of the one or more derived limits. In an embodiment of the present disclosure, the first subset comprises one or more strict limits and one or more indifference limits from the one or more derived limits. In other words, the concordance index for each of the one or more process parameters is computed using the one or more strict limits and the one or more indifference limits from the one or more derived limits. FIG. 7A, with reference to FIGS. 1 through 6B, depicts an exemplary diagram of a concordance index being computed for each of the one or more process parameters of an equipment operating in the industry plant, in accordance with an embodiment of the present disclosure. FIG. 7B, with reference to FIGS. 1 through 6B, depicts a flow chart illustrating a method for computing the concordance index for each of the one or more process parameters of the equipment operating in the industry plant, in accordance with an embodiment of the present disclosure. FIGS. 7C-7D, with reference to FIGS. 1 through 7B, depict exemplary diagrams illustrating computation of the concordance index for temperature and pressure serving as a process parameter of the equipment operating in the industry plant, in accordance with an embodiment of the present disclosure. More specifically, FIG. 7C depicts an exemplary diagram illustrating computation of the concordance index for temperature serving as a process parameter of the equipment operating in the industry plant, in accordance with an embodiment of the present disclosure. It can be observed that when the process variable "$g_i$" approaches the indifferent region, the concordance index increases and reaches "1" when $g_i = q$ i.e., at the indifferent limit. The concordance index function is shown in FIG. 7A. FIG. 7D depicts an exemplary diagram illustrating computation of the concordance index for pressure serving as a process parameter of the equipment operating in the industry plant, in accordance with an embodiment of the present disclosure. In an embodiment of the present disclosure, the concordance index computed for each of the one or more process parameters results in a set of concordance indices.

Figure 8A:
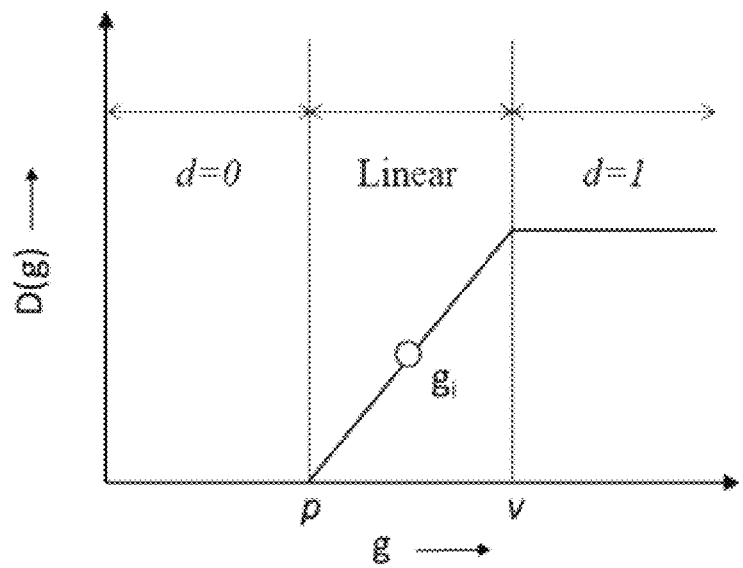
FIG. 8A depicts an exemplary diagram of a discordance index being computed for each of the one or more process parameters of the equipment operating in the industry plant, in accordance with an embodiment of the present disclosure.

Referring to FIG. 2, at step 210 of the present disclosure, the one or more hardware processors 104 computing a discordance index (DI) for each of the one or more process parameters using a second subset of the one or more derived limits. In an embodiment of the present disclosure, the second subset comprises one or more strict limits and one or more veto limits from the one or more derived limits. Discordance index "D" is a fuzzy index defined such that it is "0" within the strict limits and "1" beyond the veto limits. Between the strict and veto limit, the index takes a linear functional form as shown in FIG. 8A. The discordance index is computed by way of following non-construing expression:

$$D(g_i) = \begin{cases} 1 & ; g_i > v \\ \dfrac{g_i - p}{v - p} & ; p \leq g_i \leq v \\ 0 & ; g_i > p \end{cases} \quad (2)$$

where, $g_i$—value of process variable, and v, p are veto and strict of the process parameter "g".

Figure 8B:
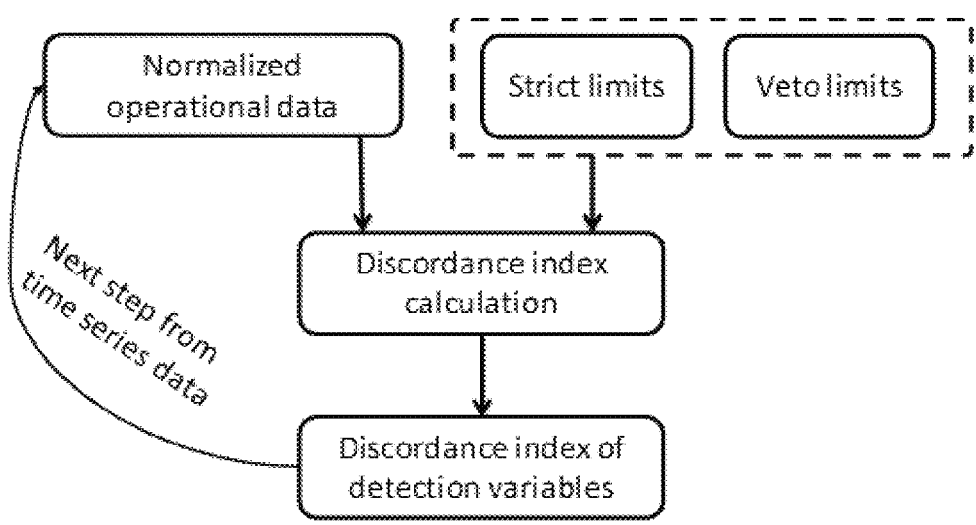
FIG. 8B depicts a flow chart illustrating a method for computing the discordance index for each of the one or more process parameters of the equipment operating in the industry plant, in accordance with an embodiment of the present disclosure.

In other words, the discordance index for each of the one or more process parameters is computed using the one or more strict limits and the one or more veto limits from the one or more derived limits. FIG. 8A, with reference to FIGS. 1 through 7D, depicts an exemplary diagram of a discordance index being computed for each of the one or more process parameters of the equipment operating in the industry plant, in accordance with an embodiment of the present disclosure. FIG. 8B, with reference to FIGS. 1 through 8A, depicts a flow chart illustrating a method for computing the discordance index for each of the one or more process parameters of the equipment operating in the industry plant, in accordance with an embodiment of the present disclosure. In an embodiment of the present disclosure, the discordance index computed for each of the one or more process parameters results in a set of discordance indices. Though the CI and the DI are computed as in steps 208 and 210 respectively, in a sequential manner, it is to be understood by a person having ordinary skill in the art or person skilled in the art that the CI and DI computation can be performed in parallel by the system 100 of the present disclosure.

Figure 8C:
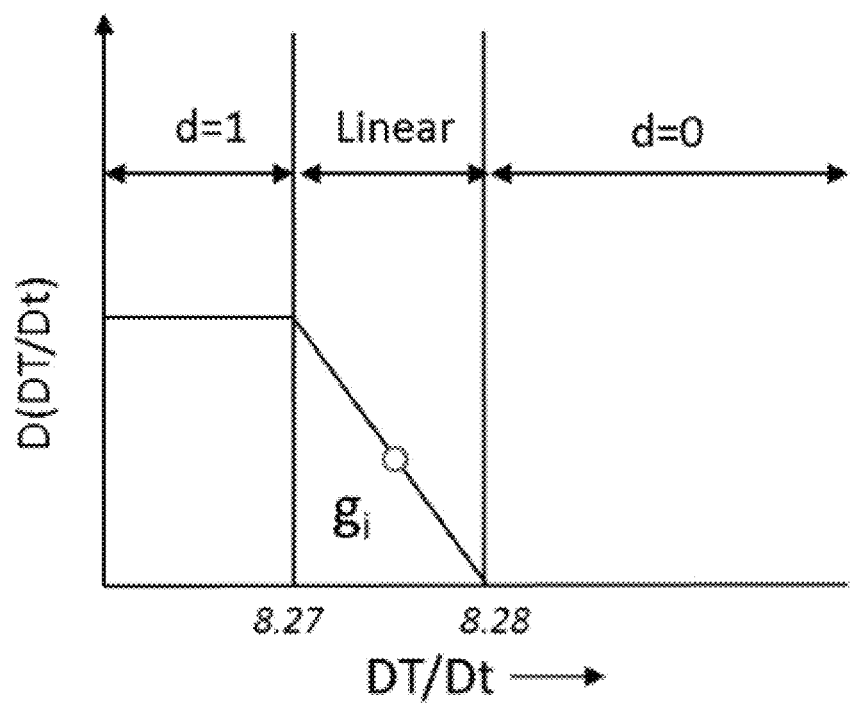
FIG. 8C depicts an exemplary diagram illustrating computation of the discordance index for temperature serving as a process parameter of the equipment operating in the industry plant, in accordance with an embodiment of the present disclosure.
Figure 8D:
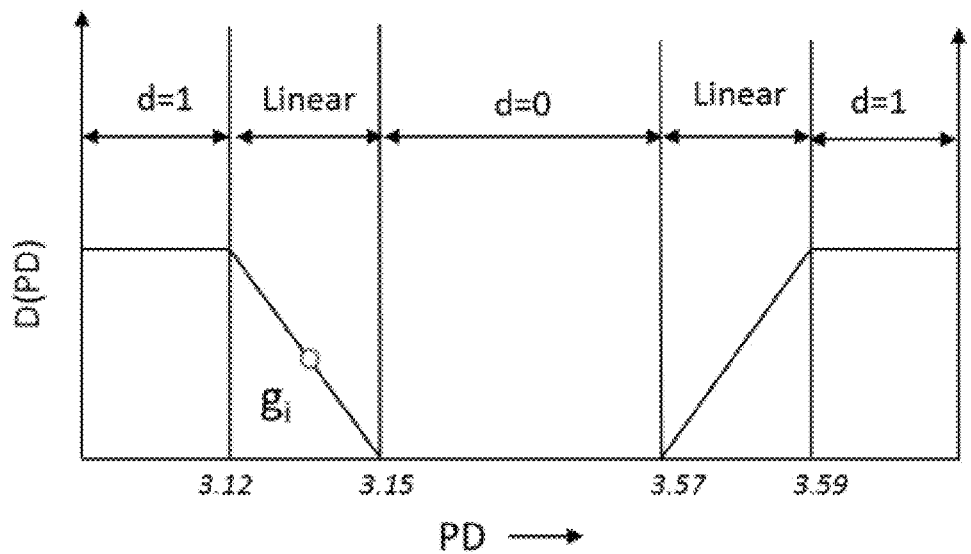
FIG. 8D depicts an exemplary diagram illustrating computation of the discordance index for pressure serving as a process parameter of the equipment operating in the industry plant, in accordance with an embodiment of the present disclosure.

FIGS. 8C-8D, with reference to FIGS. 1 through 8B, depict exemplary diagrams illustrating computation of the discordance index for temperature and pressure serving as a process parameter of the equipment operating in the industry plant, in accordance with an embodiment of the present disclosure. More specifically, FIG. 8C depicts an exemplary diagram illustrating computation of the discordance index for temperature serving as a process parameter of the equipment operating in the industry plant, in accordance with an embodiment of the present disclosure. FIG. 8D depicts an exemplary diagram illustrating computation of the discordance index for pressure serving as a process parameter of the equipment operating in the industry plant, in accordance with an embodiment of the present disclosure.

Referring to FIG. 2, at step 212 of the present disclosure, the one or more hardware processors 104 compute a single degree of credibility (DOC) for all the one or more process parameters based on (i) a computed global concordance index and (ii) the discordance index computed for each of the one or more process parameters, thus resulting in the set of discordance indices. In other words, the single degree of credibility (DOC) for all the one or more process parameters based on (i) a computed global concordance index and (ii) the set of discordance indices. The computed global concordance index is based on the concordance index (CI) and an associated weight of the one or more process parameters. In other words, the global concordance index is computed based on the set of concordance indices and an associated weight of the one or more process parameters.

In general, a complex detection condition is composed of logical conditions on different process variables as shown in below equation (3):

$$(g1<2\|g1>4)\&\&(g2<5\|g2>8)\&\&(g3<10\|g3>15) \quad (3)$$

Here, g1, g2 and g3 are the process variables. For such a detection condition which is composed of multiple conditions on the governing process variables a global concordance index (GC) is defined as the weighted sum of the concordance indices of the individual constituent conditions. The weights or priority for each process parameter can be specified using domain knowledge or data-based models built on the past operational data (historical data learnt by the system 100 over a time period (e.g., say 6 months). The global concordance index is computed by way of following non-construing expression:

$$G_C = \frac{\Sigma_j w_j C_j(g_j)}{\Sigma_j w_j} \quad (4)$$

where, $g_j$ is jth process parameter of a detection condition, $w_j$ is weight of a process parameter, $C_j$ is concordance index of jth process parameter.
The DOC is computed by way of following non-construing expression:

$$\delta = G_C \Pi_{j \in F} \frac{1 - D_j}{1 - G_C} \quad (5)$$

where, $F = \{j | D_j > G_c\}$, $\delta$ is Degree of Credibility, $G_c$—Global concordance index and $D_j$—Discordance index of the jth process parameter in a detection condition.

At step 214 of the present disclosure, the one or more hardware processors predicting an early warning specific to at least one operating mode of the one or more equipment operating in the industry plant. The expression "early warning" in the present disclosure refers to an advance warning of a failure that is likely to occur in (i) one or more processes running in equipment, and/or (ii) in the behavior of the equipment, operating in the industry plant. More specifically, the early warning is predicted much in advance even before the failure occurs. For instance, say a failure is likely to occur say tomorrow in at least one of a process and/or behaviour of an equipment in the industry plant based on its running conditions. With the method of the present disclosure, the failure is predicted much in advance, for example, in this case, say a few hours/a previous day before the failure occurring day (which in this case is tomorrow). In other words, the warning may be an advance alert indicative of a failure that is likely to occur in (i) one or more processes running in equipment, and/or (ii) in the behavior of the equipment. Based on the predicted early warning, corrective action against early warning can be taken with the help of input(s). The input(s) may be either driven by the system 100 based on its learning pattern by using the historical data and prediction activities or the input(s) may be provided by users (e.g., operators in the industry plant). The system 100 can on its own can suggest or recommend corrective actions to be taken to recover from the potential or upcoming failure mode (being predicted). Based on such recommendation(s) by the system 100, the operator(s) may act on the equipment/industry plant and prevent such failures in the future. The early warning is predicted based on a comparison of (i) a value of the single DOC of all the one or more process parameters and (ii) a pre-defined threshold. The pre-defined threshold is configurable based on the requirement and can be dynamically set by the system 100 by learning the historical pattern of the operating modes and its failure prediction of the past associated with each equipment operating in the industry plant. Assuming that there are DOC computed for process parameters, the average of these DOC is computed and compared with the pre-defined threshold. In the present disclosure, based on the experiment conducted, the threshold was set to 0.5. In such scenarios, the average of DOC was compared with the value 0.5. If the average value of the last 5 values DOC is less than 0.5, then early warning pertaining to operating mode (e.g., failure mode, wherein say the equipment is likely to fail at a specific timestamp) is detected by the system 100 for a process/equipment being run in the industry plant. It is to be understood by a person having ordinary skill in the art or person skilled in the art that though the average value of DOC is computed for all the DOC of the process parameters, such average value consideration shall not be construed as limiting the scope of the present disclosure. In other words, the present disclosure may consider different ways of mathematical models other than obtaining average value of DOC, and output value specific to DOC obtained from other mathematical models can be compared with the pre-defined threshold to predict early warnings of the equipment operating in the industry plant.

As mentioned above, the AI based technique(s) or ML models are comprised in the memory 102 of the system 100 and are invoked and executed by the system 100 for learning the historical pattern of (i) time-series data obtained, (ii) how the obtained time-series data was normalized and how the various limits were derived, (iii) how CI and DI were computed, (iv) how the global CI was computed, (v) computation of DOC, and (vi) various early warnings predicted for equipment(s) operated in the industry plant. The historical pattern learning can be recurring activity to improve overall prediction of early warnings indicative of the at least one operating mode associated with each equipment operating in the industry plant.

In an embodiment, the at least one operating mode comprises a failure mode or a normal operation mode. If the discordance index ($D_j$) of even one process variable/parameter in a detection condition is less than the global concordance index ($G_c$), the degree of credibility ($\delta$) is taken to be equal to the global concordance index ($\delta$). Also, it can be seen from equation (5) that if any of the discordance indices is equal to 1, the degree of credibility vanishes to "0". A degree of credibility of "1" or near to "1" indicates that the process variables/process parameters are in an acceptable range of the threshold windows. A fall in the same is indicative of the detection condition being satisfied leading to a failure of the system. Degree of credibility goes to "0" even if one of the process parameters in a detection condition is outside the veto limits, indicating the approach of a failure event.

Figure 9:
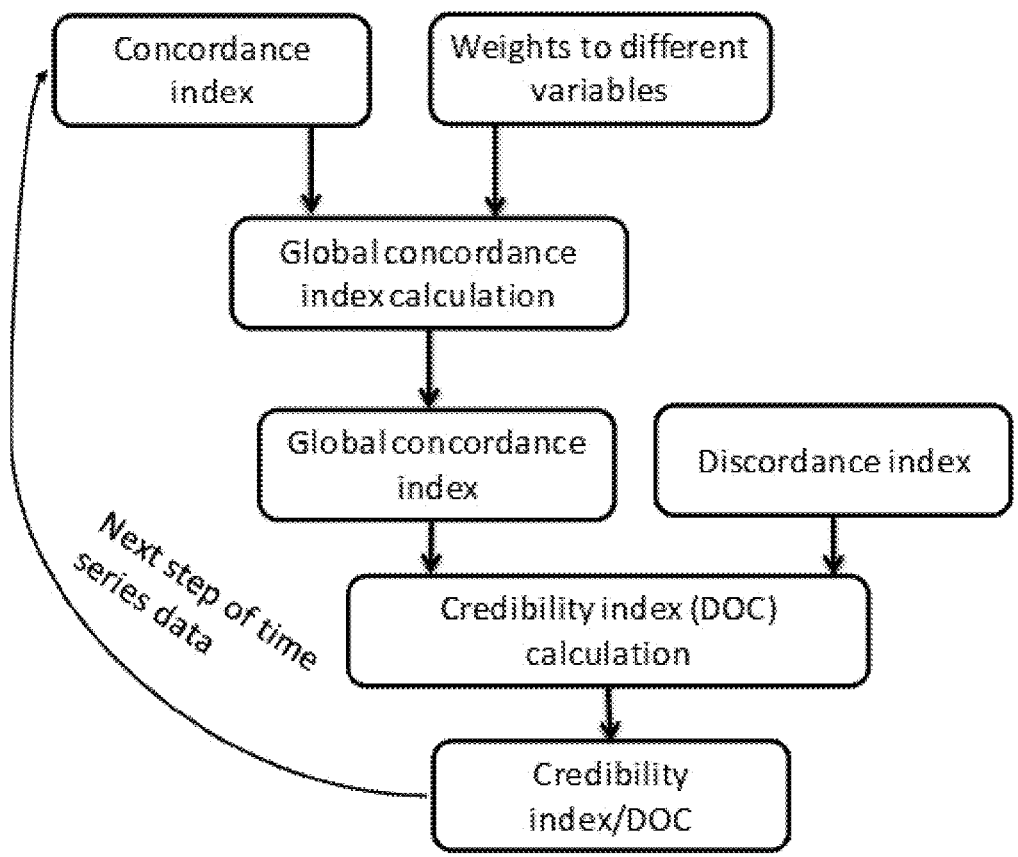
FIG. 9 depicts a flow chart illustrating a method for computing a single global concordance index and one degree of credibility (DOC) for all the one or more process parameters together thereof based on the computed global concordance index and the discordance index, in accordance with an embodiment of the present disclosure.

FIG. 9, with reference to FIGS. 1 through 8D, depicts a flow chart illustrating a method for computing a global concordance index and one degree of credibility (DOC) for all the one or more process parameters together thereof based on the computed global concordance index and the discordance index, in accordance with an embodiment of the present disclosure.

Figure 10:
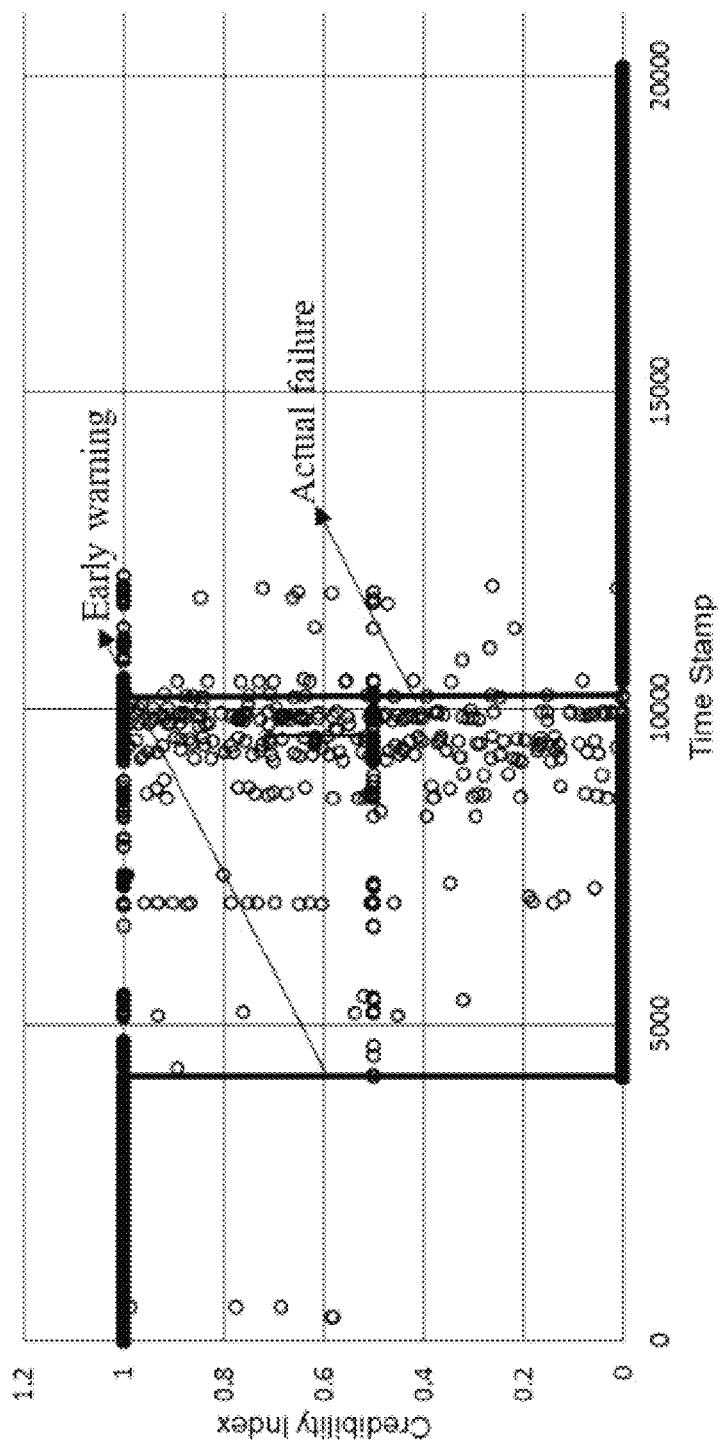
FIG. 10 depicts a graphical representation illustrating prediction of an early warning specific to at least one operating mode of the one or more equipment operating in the industry plant, in accordance with an embodiment of the present disclosure.

FIG. 10, with reference to FIGS. 1 through 9, depicts a graphical representation illustrating prediction of an early warning specific to at least one operating mode of the one or more equipment operating in the industry plant, in accordance with an embodiment of the present disclosure.

Experimental Results:

The use case/application of the present disclosure and implementation of its systems and methods in prediction of leakage is that of an oil refinery illustrated by way of an example, and such example shall not be construed as limiting the scope of the present disclosure. The corresponding detection conditions as identified (say by a process engineer) are:

1. Non-maintenance of a pressure differential (PD) across a slide-valve of a pipe carrying the catalyst material
2. Sudden drop in temperature (T) in the compensator as indicated by a rate of change of temperature (DT/Dt)

The detection condition for the failure mode of leakage is mathematically represented in below equation (6):

$$DT/Dt < 8.27 \& (PD < 3.12 \| PD > 3.59) \quad (6)$$

Typically, an operator reports the leakage using an incident reporting tool which generates an incident report. Data of the pressure differential and rate of change of temperature one day prior and after the incident time were considered to test the method of the present disclosure.

A slice of the normalized time-series data of pressure differential and rate of temperature is shown in Table 1 below:

TABLE 1

| Time stamp | DT/Dt | PD |
|---|---|---|
| 1 | 8.50 | 3.47 |
| 2 | 8.40 | 3.35 |

TABLE 1-continued

| Time stamp | DT/Dt | PD |
|---|---|---|
| 3 | 8.38 | 3.20 |
| 4 | 8.35 | 3.17 |
| 5 | 8.33 | 3.16 |
| 6 | 8.31 | 3.15 |
| 7 | 8.30 | 3.10 |
| 8 | 8.28 | 3.08 |
| 9 | 8.26 | 3.05 |
| 10 | 8.20 | 3.01 |

Around the time of the failure event, the temperature falls steeply and goes below the detection condition limit as shown in 3A. Similarly, around the failure incident time the pressure differential across the slide-valve is outside the detection limits as shown in FIG. 3B. In accordance with the veto limits, the strict and indifference limits are specified for both the process parameters—temperature (T) and pressure differential (PD) are shown in FIGS. 6A-6B. The concordance and discordance indices of both rate of change of temperature and pressure differential are defined using the various limits as shown in FIGS. 7C-7D and FIGS. 8C-8D respectively.

Slice of data from Table 1 has been considered to calculate concordance, discordance, global concordance indices and degree of credibility. Concordance index definition of rate of temperature is represented in (7) using indifference and strict limit. Concordance indices are calculated for both process variables/process parameters as shown in Table 2 below.

$$C(DT/Dt_i) = \begin{cases} 1 & ; DT/Dt_i > 8.29 \\ \dfrac{8.29 - DT/Dt_i}{8.29 - 8.28} & ; 8.28 < DT/Dt_i \le 8.29 \\ 0 & ; DT/Dt_i < 8.28 \end{cases} \quad (7)$$

Discordance index definition of rate of temperature is represented in equation (8) using strict and veto limit. Discordance indices are calculated for both process variables as shown in Table 2 below.

$$D(DT/Dt_i) = \begin{cases} 1 & ; DT/Dt_i < 8.27 \\ \dfrac{8.28 - DT/Dt_i}{8.28 - 8.27} & ; 8.27 < DT/Dt_i \le 8.28 \\ 0 & ; DT/Dt_i > 8.28 \end{cases} \quad (8)$$

Global concordance index is calculated from equation (4) and is shown in Table 2. The global concordance and discordance indices are combined as in equation (5) to obtain the degree of credibility as shown in Table 2. As it can be seen from Table 2, the detection condition for failure mode from equation (6) is satisfied at 9th time stamp. But degree of credibility less than 0.5 (e.g., the pre-defined threshold for the given use case as mentioned above) is detected 7th time stamp. This is used to predict an operating mode of equipment (e.g., in this case the failure incident before the incident occurs and has been reported in the incident management tool). Early warning prediction is depicted in FIG. 10.

TABLE 2

| Time stamp | DT/Dt | PD | C(DT/Dt) | D(DT/Dt) | C(PD) | D(PD) | $G_c$ | δ |
|---|---|---|---|---|---|---|---|---|
| 1 | 8.50 | 3.47 | 1 | 0 | 1 | 0 | 1 | 1 |
| 2 | 8.40 | 3.35 | 1 | 0 | 1 | 0 | 1 | 1 |
| 3 | 8.38 | 3.20 | 1 | 0 | 1 | 0 | 1 | 1 |
| 4 | 8.35 | 3.17 | 1 | 0 | 1 | 0 | 1 | 1 |
| 5 | 8.33 | 3.16 | 1 | 0 | 0.5 | 0 | 0.75 | 0.75 |
| 6 | 8.31 | 3.15 | 1 | 0 | 0 | 0 | 0.5 | 0.5 |
| 7 | 8.30 | 3.10 | 1 | 0 | 0 | 1 | 0.5 | 0 |
| 8 | 8.28 | 3.08 | 0 | 0 | 0 | 1 | 0 | 0 |
| 9 | 8.26 | 3.05 | 0 | 1 | 0 | 1 | 0 | 0 |
| 10 | 8.20 | 3.01 | 0 | 1 | 0 | 1 | 0 | 0 |

The present disclosure and its systems and methods implement fuzzy functions (e.g., concordance index, discordance index and the like) to evaluate a detection condition and combine the fuzzy functions of individual detection conditions into a condition on the composite index (e.g., degree of credibility). By moving away from Boolean to fuzzy/continuous deterministic logic systems and methods of the present disclosure factor-in the uncertainty or partial nature of the available information about the detection thresholds which otherwise is not possible in the conventional systems and methods. In the present disclosure, a complex detection condition is represented by a composite index derived from the fuzzy indices of the constituent conditions. Further, by definition, a fuzzy index of a process parameter maps the truth value of a detection condition from being binary (either 0 or 1) to continuous parameter that takes any value between 0 and 1. An early warning limit can be set on such a composite index.

Further, the present disclosure utilizes concepts from outranking algorithms such as Electre III method and these are applied to the field of failure detection. Therefore, method of the present disclosure involves combining knowledge of the fuzzy indices of individual constituent conditions in a complex detection condition into a composite fuzzy index and using it to set the condition for the onset of a failure which is not realized in the conventional art/approaches and systems. More specifically, the present disclosure adapts the concepts of fuzzy indices from the field of ranking algorithms to the field of failure event prediction.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for predicting early warnings of an operating mode of equipment in an industry plant, the method comprising:

learning, via one or more hardware processors, historical pattern based on implementation of at least one of artificial intelligence and machine learning models, wherein the historical pattern is related to operating modes and a failure prediction of historical operating modes associated with the equipment operating in the industry plant;

setting in a memory, via the one or more hardware processors, a pre-defined threshold for each process that is run on the equipment, based on the learned historical pattern by at least one of artificial intelligence and machine learning models;

obtaining, via the one or more hardware processors, time-series data from sensors associated with one or more equipment operating in the industry plant, wherein the time-series data pertains to one or more process parameters associated with one or more processes running on the equipment operating in the industry plant;

pre-processing, via the one or more hardware processors, the obtained time-series data to obtain normalized time-series data, wherein the pre-processing is applied on the obtained time-series data to remove a noise, high negative values and any unusual readings and impute missing data;

deriving, via the one or more hardware processors, one or more limits from at least one of the normalized time-series data and a data sheet obtained that is specific to the industry plant;

computing, via the one or more hardware processors, a concordance index (CI) for the one or more process parameters obtained from the sensors using a first subset of the one or more derived limits, wherein the CI is a fuzzy index defined such that the CI is "0" beyond one or more strict limits and the CI is "1" within one or more indifference limits;

computing, via the one or more hardware processors, a discordance index (DI) for the one or more process parameters using a second subset of the one or more derived limits, wherein the discordance index is a fuzzy index defined such that the DI is "0" within the one or more strict limits and the DI is "1" beyond one or more veto limits;

determining, via the one or more hardware processors, a weight of the one or more process parameters based on training of data-based models, wherein the data-based models are built using historical data learnt over a time period;

computing, via the one or more hardware processors, a degree of credibility (DOC) for the one or more process parameters based on a computed global concordance index and the computed discordance index for each of the one or more process parameters;

predicting, via the one or more hardware processors, an early warning specific to at least one operating mode of the one or more equipment operating in the industry plant, based on a value of the DOC of the one or more process parameters and the set pre-defined threshold, wherein the early warning corresponds to predicting a failure in advance, that is likely to occur in (i) one or more processes running in equipment, and (ii) in the behavior of the equipment operating in the industry plant;

suggesting, via the one or more hardware processors, corrective actions to be taken to recover from the predicted failure; and driving, via the one or more hardware processors, inputs corresponding to the corrective actions based on the learned historical pattern.

2. The processor implemented method as claimed in claim 1, wherein the one or more derived limits comprise the one or more veto limits, the one or more strict limits, and the one or more indifference limits.

3. The processor implemented method as claimed in claim 1, wherein the one or more derived limits are specific to the one or more process parameters of one or more processes being run in the industry plant.

4. The processor implemented method as claimed in claim 1, wherein the first subset of the one or more derived limits comprises the one or more strict limits and the one or more indifference limits.

5. The processor implemented method as claimed in claim 1, wherein the second subset of the one or more derived limits comprises the one or more strict limits and the one or more veto limits.

6. The processor implemented method as claimed in claim 1, wherein the computed global concordance index is based on the computed concordance index (CI) and the determined weight of the one or more process parameters.

7. The processor implemented method as claimed in claim 1, wherein the early warning is predicted based on a comparison of (i) the value of the DOC of the one or more process parameters and (ii) the set pre-defined threshold.

8. The processor implemented method as claimed in claim 1, wherein the at least one operating mode comprises a failure mode or a normal operation mode.

9. A system for predicting early warnings of an operating mode of equipment in an industry plant, the system comprising:

a memory storing instructions;
one or more communication interfaces; and
one or more hardware processors coupled to the memory via the one or more communication interfaces, wherein the one or more hardware processors are configured by the instructions to:

learn historical pattern based on implementation of at least one of artificial intelligence and machine learning models, wherein the historical pattern is related to operating modes and a failure prediction of historical operating modes associated with the equipment operating in the industry plant;

set in the memory a pre-defined threshold for each process that is run on the equipment, based on the learned historical pattern by at least one of artificial intelligence or machine learning models;

obtain time-series data from sensors associated with one or more equipment operating in the industry plant, wherein the time-series data pertains to one or more process parameters associated with one or more processes running on the equipment operating in the industry plant;

pre-process the obtained time-series data to obtain normalized time-series data wherein the pre-processing is applied on the obtained time-series data to remove a noise, one of high negative values or any unusual readings, and impute missing data;

derive one or more limits from at least one of the normalized time-series data and a data sheet obtained that is specific to the industry plant;

compute a concordance index (CI) for one or more process parameters obtained from the sensors using a first subset of the one or more derived limits, wherein the CI is a fuzzy index defined such that the CI is "0"

beyond one or more strict limits and the CI is "1" within one or more indifference limits;

compute a discordance index (DI) for the one or more process parameters using a second subset of the one or more derived limits, wherein the DI is a fuzzy index defined such that the DI is "0" within the one or more strict limits and the DI is "1" beyond one or more veto limits;

determine a weight of the one or more process parameters based on training of data-based models, wherein the data-based models are built using historical data learnt over a time period;

compute a degree of credibility (DOC) for the one or more process parameters based on a computed global concordance index and the computed discordance index for each of the one or more process parameters;

predict an early warning specific to at least one operating mode of the one or more equipment operating in the industry plant based on a value of the DOC of the one or more process parameters and the set pre-defined threshold, wherein the early warning corresponds to predicting a failure in advance, that is likely to occur in (i) one or more processes running in equipment, and (ii) in the behavior of the equipment, operating in the industry plant;

suggest corrective actions to be taken to recover from the predicted failure; and drive inputs corresponding to the corrective actions based on the learned historical pattern.

10. The system as claimed in claim 9, wherein the one or more derived limits comprise the one or more veto limits, the one or more strict limits, and the one or more indifference limits.

11. The system as claimed in claim 9, wherein the one or more derived limits are specific to the one or more process parameters of one or more processes being run in the industry plant.

12. The system as claimed in claim 9, wherein the first subset of the one or more derived limits comprises the one or more strict limits and the one or more indifference limits.

13. The system as claimed in claim 9, wherein the second subset of the one or more derived limits comprises the one or more strict limits and the one or more veto limits.

14. The system as claimed in claim 9, wherein the computed global concordance index is based on the computed concordance index (CI) and the determined weight of the one or more process parameters.

15. The system as claimed in claim 9, wherein the early warning is predicted based on a comparison of (i) the value of the DOC of the one or more process parameters and (ii) the set pre-defined threshold.

16. The system as claimed in claim 9, wherein the at least one operating mode comprises a failure mode or a normal operation mode.

17. A computer program product comprising a non-transitory computer readable medium having a computer readable program embodied therein, wherein the computer readable program, when executed on a computing device, causes the computing device to predict early warnings of an operating mode of equipment in an industry plant by:

learning, via one or more hardware processors, historical pattern based on implementation of at least one of artificial intelligence and machine learning models, wherein the historical pattern is related to operating modes and a failure prediction of historical operating modes associated with each equipment operating in the industry plant;

setting in a memory, via the one or more hardware processors, a pre-defined threshold for each process that is run on the equipment, based on the learned historical pattern by at least one of artificial intelligence and machine learning models;

obtaining, via the one or more hardware processors, time-series data from sensors associated with one or more equipment operating in the industry plant, wherein the time-series data pertains to one or more process parameters associated with one or more processes running on the equipment operating in the industry plant;

pre-processing, via the one or more hardware processors, the obtained time-series data to obtain normalized time-series data, wherein the pre-processing is applied on the obtained time-series data to remove a noise, one of high negative values or any unusual readings, and impute missing data;

deriving, via the one or more hardware processors, one or more limits from at least one of the normalized time-series data and a data sheet obtained that is specific to the industry plant;

computing, via the one or more hardware processors, via the one or more hardware processors, a concordance index (CI) for the one or more process parameters obtained from the sensors using a first subset of the one or more derived limits, wherein the CI is a fuzzy index defined such that the CI is "0" beyond one or more strict limits and the CI is "1" within one or more indifference limits;

computing, via the one or more hardware processors, a discordance index (DI) for the one or more process parameters using a second subset of the one or more derived limits, wherein the discordance index is a fuzzy index defined such that the DI is "0" within the one or more strict limits and the DI is "1" beyond one or more veto limits;

determining, via the one or more hardware processors, a weight of the one or more process parameters based on training of data-based models, wherein the data-based models are built using historical data learnt over a time period;

computing, via the one or more hardware processors, a degree of credibility (DOC) for the one or more process parameters based on a computed global concordance index and the computed discordance index for each of the one or more process parameters; and predicting, via the one or more hardware processors, an early warning specific to at least one operating mode of the one or more equipment operating in the industry plant, based on a value of the DOC of the one or more process parameters and the set pre-defined threshold, wherein the early warning corresponds to predicting a failure in advance, that is likely to occur in (i) one or more processes running in equipment, and (ii) in the behavior of the equipment, operating in the industry plant;

suggesting, via the one or more hardware processors, corrective actions to be taken to recover from the predicted failure; and driving, via the one or more hardware processors, inputs corresponding to the corrective actions based on the learned historical pattern.

18. He computer program product of claim 17, wherein the one or more derived limits comprise the one or more veto limits, the one or more strict limits, and the one or more indifference limits, wherein the one or more derived limits are specific to the one or more process parameters of one or more processes being run in the industry plant, wherein the first subset comprises the one or more strict limits and the one or more indifference limits, wherein the second subset comprises the one or more strict limits and the one or more veto limits, wherein the computed global concordance index is based on the concordance index (CI) and the determined weight of the one or more process parameters, wherein the early warning is predicted based on a comparison of (i) the value of the DOC of the one or more process parameters and (ii) the set pre-defined threshold, and wherein the at least one operating mode comprises a failure mode or a normal operation mode.

* * * * *